US008160974B2

(12) United States Patent
Schoonmaker et al.

(10) Patent No.: US 8,160,974 B2
(45) Date of Patent: Apr. 17, 2012

(54) MULTIPLE CARRIER MAILING MACHINE

(75) Inventors: Richard Schoonmaker, Wilton, CT (US); Edilberto I. Salazar, Brookfield, CT (US); David W. Beckstrom, Milford, CT (US); Boris Rozenfeld, New Milford, CT (US); Robert A. Cordery, Danbury, CT (US); George M. Macdonald, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 274 days.

(21) Appl. No.: 12/345,574

(22) Filed: Dec. 29, 2008

(65) Prior Publication Data

US 2010/0169241 A1 Jul. 1, 2010

(51) Int. Cl.
*G06F 17/00* (2006.01)

(52) U.S. Cl. ........................................................ 705/401

(58) Field of Classification Search ........................ None
See application file for complete search history.

(56) References Cited

U.S. PATENT DOCUMENTS 4,376,299 A 3/1983 Rivest
4,569,022 A 2/1986 Coppola et al.
4,813,912 A 3/1989 Chickneas et al.
5,007,054 A 4/1991 Lee et al.
5,051,914 A 9/1991 Sansone et al.
5,068,797 A 11/1991 Sansone et al.
5,072,401 A 12/1991 Sansone et al.
5,224,046 A 6/1993 Kim et al.
5,699,258 A 12/1997 Theil
5,731,980 A * 3/1998 Dolan et al. .................. 705/410
5,812,990 A 9/1998 Ryan, Jr. et al.
5,960,418 A 9/1999 Kelly et al.
5,983,264 A 11/1999 Gardner
6,006,211 A 12/1999 Sansone et al.
6,061,670 A 5/2000 Brand
6,064,994 A 5/2000 Kubatzki et al.
6,085,181 A 7/2000 Gravell et al.
6,085,795 A 7/2000 Ogawa et al.
6,098,058 A 8/2000 Gravell et al.
6,151,590 A 11/2000 Cordery et al.
6,151,591 A 11/2000 Pierce et al.
6,178,412 B1 * 1/2001 Ratzenberger et al. ........ 705/408
6,202,057 B1 3/2001 Pierce
6,226,626 B1 5/2001 Theil
6,282,525 B1 8/2001 Kubatzki et al.
6,321,214 B1 * 11/2001 Thiel ............................ 705/408
6,356,882 B1 3/2002 Carroll et al.
6,470,327 B1 10/2002 Carroll et al.
6,772,130 B1 8/2004 Karbowski et al.
(Continued)

OTHER PUBLICATIONS

"First class mailers", Bob Gragg, American Printer v219n6 pp. 68-69, Sep. 1997.*

*Primary Examiner* — Rutao Wu

(74) *Attorney, Agent, or Firm* — George M. Macdonald; Charles R. Malandra, Jr.; Steven J. Shapiro

(57) ABSTRACT

Systems and methods including mailing machines having postage meters including multiple postal security devices are described. In one illustrative configuration, a postage meter having multiple postal security devices for use with different postal carriers is described. In another illustrative configuration, a postage meter is configured to apply two postage payment information indicia to a single mail piece using two separate postal security devices.

17 Claims, 6 Drawing Sheets

U.S. PATENT DOCUMENTS

| | | | | |
|---|---|---|---|---|
| 6,789,193 | B1 | 9/2004 | Heiden | |
| 6,813,613 | B1 | 11/2004 | Lee et al. | |
| 6,847,952 | B2 | 1/2005 | Beckstrom et al. | |
| 6,865,557 | B1 | 3/2005 | Cordery et al. | |
| 6,934,594 | B2 | 8/2005 | Loring et al. | |
| 6,963,861 | B1 | 11/2005 | Boucher et al. | |
| 6,976,007 | B1 | 12/2005 | Boucher et al. | |
| 7,177,933 | B2 | 2/2007 | Foth | |
| 7,346,590 | B2 | 3/2008 | Critelli et al. | |
| 7,389,274 | B2 | 6/2008 | Sansone et al. | |
| 7,613,654 | B2 * | 11/2009 | Jenny et al. | 705/39 |
| 2007/0260561 | A1 * | 11/2007 | Martin et al. | 705/403 |

* cited by examiner

MULTIPLE CARRIER MAILING MACHINE

FIELD OF THE INVENTION

The illustrative embodiments described in the present application relate generally to mailing machines having postage meters including multiple postal security devices, and more particularly postage meters having multiple postal security devices for use with different postal carriers.

BACKGROUND

Mailing machines for printing postage indicia as evidence of postage payment on envelopes and other forms of mail pieces have enjoyed considerable commercial success. There are many different types of mailing machines, ranging from relatively small units that handle only one mail piece at a time, to large, multi-functional units that can process hundreds of mail pieces per hour in a continuous stream operation. Prior modern mailing machines that include postage meters store funds locally in a physically secure electronic postal security device (PSD). The postage fund credits are acquired though a postage purchase transaction known as a reset that is now typically electronically processed over a network connected to a data center.

Mailers that wish to use multiple carriers must typically manually decide which mail to induct with each separate carrier and then use separate mailing machines to process the outgoing mail assigned to each carrier. Some mailing machines are created in a generic fashion and then "localized" to configure the postal security device to operate with the particular currency, postal rates and indicia format required. For example, commonly-owned U.S. Pat. No. 6,178,412 B1, issued Jan. 23, 2001 to Roger J. Ratzenberger, Jr., et al. describes a postage metering system that is configurable to adapt to a particular currency and is incorporated herein by reference in its entirety.

However, there is a need for an integrated system that will allow a user to automatically or manually select from a plurality of carriers and securely create postal indicia for each carrier while using a single mailing machine.

SUMMARY

The present application describes illustrative embodiments of systems and methods including mailing machines having postage meters including multiple postal security devices. In one illustrative configuration, a postage meter having multiple postal security devices for use with different postal carriers is described. The mailing machine includes a carrier selection subsystem in order to identify the appropriate carrier based upon preset or input criteria.

In another illustrative configuration, an alternative multiple-carrier, multiple-PSD mailing machine includes a route selection subsystem for selecting at least two carriers for sequential delivery of the mail piece. A first indicium is printed on the mail piece to evidence postage payment for the first carrier and the mail piece is addressed to the second carrier. A second indicium is printed on the mail piece to evidence postage payment for the second carrier and to provide an indication of the destination address.

In yet another illustrative configuration, an alternative multiple-carrier, multiple-PSD mailing machine includes an output sorting device that sorts finished mail pieces after indicia printing into separate output bins, one for each carrier the machine supports.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
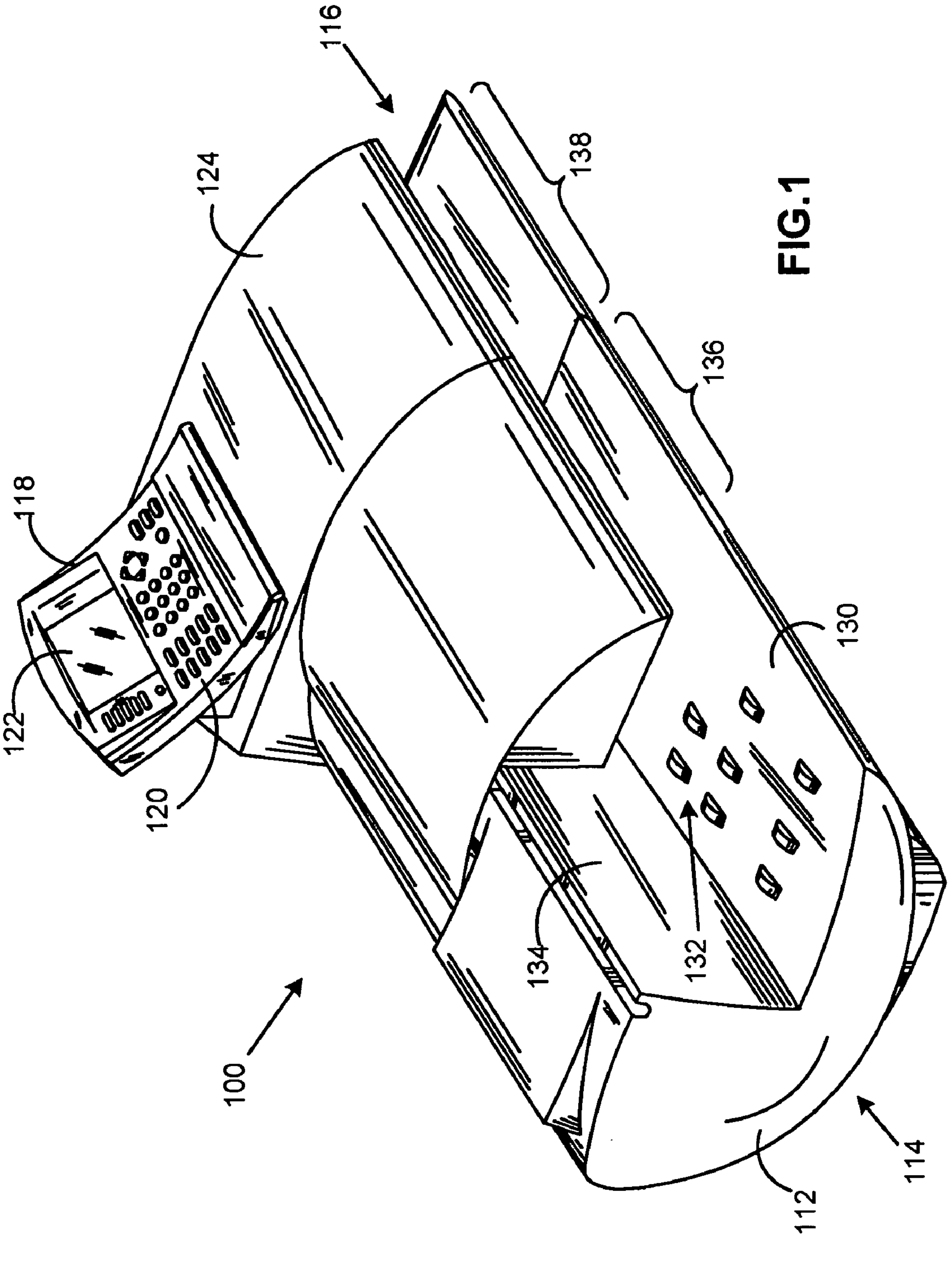
FIG. 1 is a schematic diagram of a mailing machine including a plurality of postal security devices according to an illustrative embodiment of the present application.

The illustrative embodiments of the present application describe systems and methods including mailing machines having postage meters including multiple postal security devices. In one illustrative configuration, a postage meter having multiple postal security devices for use with different postal carriers is described. The mailing machine includes a carrier selection subsystem in order to identify the appropriate carrier based upon preset or input criteria. In another illustrative configuration, an alternative multiple-carrier, multiple-PSD mailing machine prints two postal indicia on a mail piece routed using two carriers. In yet another illustrative configuration, an alternative multiple-carrier, multiple-PSD mailing machine includes an output sorting device. The illustrative embodiments described herein relate to postage value transactions, but the teachings of the embodiments described may be applied to other value metering devices.

In traditional mailing machines, a single postage meter includes a single postal security device (PSD) that may include a physically secure multiple integrated circuit module or other cryptographic processor. The PSD is typically used to process postage transactions for a single carrier and to create the data required to securely print a postal indicium as evidence of postage payment for a carrier such as the United States Postal Service (USPS). There is typically a national postal service operating in each country with a robust postal service. It has been common for many of those countries to support postage meters for providing evidence of postage payment by way of printed postage indicia. A company that desires to induct mail with a plurality of carriers would typically purchase or lease a postage meter applicable to each relevant postal service. Moreover, certain jurisdictions including many countries of the European Union (EU) are liberalizing the postal service market and moving away from national delivery monopolies to open competition among multiple carriers. There is a need for an integrated system that will allow a user to automatically or manually select from a plurality of carriers and securely create postal indicia for each carrier while using a single mailing machine.

Currently, parties who send mail typically manual decide which mail to send using a particular carrier. In systems have a national delivery monopoly such as the USPS, there is only one carrier choice permitted for domestic letter mail. However, in other countries, such as certain countries in the EU, it is possible to select from among a plurality of carriers. The postal system users would manually sort outgoing mail by desired carrier using pre-established business rules or other mail sending customer preferences. Once sorted, the mail in each separate stack is processed through a postal/carrier evidencing machine associated with the selected carrier, such as a mailing machine with a meter that imprints USPS postage. Postage printed is accounted for in the associated PSD which is used for only the one particular carrier USPS. Mail to be sent by another carrier must be run through a different dedicated metering device having a separate postal security device.

Certain illustrative embodiments of the present application describe a mailing machine that contains a postage metering device which can hold funds, print out postage evidencing mark and account for two or more carriers. Business rules can be programmed into the metering device to select the appropriate carrier, select the corresponding PSD, print an evidencing mark such as an IBIP Barcode, and account for the postage/funds used. A PSD for each separate carrier/postal service supported can be plugged into the postage meter simultaneously. Furthermore, an additional slot could be provided to allow use of pre-paid postage cards for one or more carriers if supported by the particular carrier. Additionally, if supported by at least two carriers, funds could be transferred between PSD's associated with different carrier with appropriate accounting for the transfers.

In another illustrative example, the multiple-carrier, multiple-PSD mailing machine may be used in conjunction with another mailing machine upstream that can be used to sort the mail by size, shape, weight, etc. The upstream mailing machine may be used to perform automated carrier selection and to print an indicator such as a barcode on each mail piece during upstream processing to indicate the desired carrier and/or rating information. The multiple-carrier, multiple-PSD mailing machine then reads the barcode and applies the appropriate postal indicium to each mail piece. In an additional alternative, a multiple-carrier, multiple-PSD mailing machine includes an output sorting device that will sort mail pieces after printing into separate bins, one bin for each carrier that the mailing machine supports.

Many mailing machines including a postage meter are configured to allow remote reset or addition of funds such as by connecting to a remote data center for postage funds purchase transactions. For example, commonly-owned U.S. Pat. No. 4,376,299 issued Mar. 8, 1983 to Rivest described data centers for remote postage meter recharging. Systems describing secure PSDs are shown in commonly-owned U.S. Pat. No. 4,813,912, issued Mar. 21, 1989 to Chickneas, et al. and U.S. Pat. No. 5,812,990 issued Sep. 22, 1998 to Ryan, Jr., et al. System for using multiple PSDs are shown in commonly-owned U.S. Pat. No. 5,731,980, issued Mar. 24, 1998 to Dolan, et al. and U.S. Pat. No. 6,847,952 B2, issued Jan. 25, 2005 to David W. Beckstrom, et al. Each of the above noted patents are incorporated herein by reference in their entirety.

Referring to FIG. 1, a schematic diagram of a mailing machine 100 including a plurality of postal security devices according to an illustrative embodiment of the present application is shown. The mailing machine 100 comprises a base unit, designated generally by the reference numeral 112, the base unit 112 includes a mail piece input end, designated generally by the reference numeral 114 and a mail piece output end, designated generally by the reference numeral 116. One or more cover members 124 are pivotally mounted on the base 112 so as to move from the closed position shown in FIG. 1 to an open position (not shown) so as to expose various operating components and parts for service and/or repair as needed. The base unit 112 further includes a horizontal feed deck 130, 136, 138 which extends substantially from the input end 114 to the output end 116. A plurality of nudger rollers 132 are suitably mounted under the feed deck 130 and project upwardly through openings in the feed deck 130 so that the periphery of the rollers 132 is slightly above the upper surface of the feed deck 130 and can exert a forward feeding force on a succession of mail pieces placed in the input end 114. A vertical wall 134 defines a mail piece stacking location from which the mail pieces are fed by the nudger rollers 132 along the feed deck 130 and into a transport subsystem that transports the media such as envelopes to be franked to the inkjet printing subsystem (not shown) that is generally located under cover 124.

A control unit 118 (user interface controller, UIC) is mounted on the base unit 112, and includes one or more input/output devices, such as, for example, a keyboard 120 and a display device 122. The control unit includes a main processor (not shown) and a plurality of postal security devices (PSDs) (not shown). In this illustrative example, mailing machine 100 comprises a modified version of the DM 500 mailing machine available from Pitney Bowes Inc. of Stamford Conn., wherein the mailing machine 100 is modified to include a plurality of postal security devices and associated carrier selection subsystems and/or multiple carrier selection subsystems as described herein with associated capability to print the indicia described herein. The plurality of postal security devices are configured as secure value vaults adapted to store postage funds and conform to the security and format requirements of each respective carrier.

The postal security devices may include a PSD associated with the USPS, a PSD associated with UK ROYAL MAIL, a PSD associated with DEUTSCHE POST AG and a PSD associated with UNITED PARCEL SERVICE (UPS). The PSDs support the appropriate currency denomination required by each carrier. For carrier operating in multiple currency regions, the mailing machine may use multiple PSDs for a particular carrier for each currency or use one PSD programmed to use the currencies that the multiple currency region carrier supports. The mailing machine 100 and its user interface controller 118 may also be connected to a co-located computer such as a DELL OPTIPLEX INTEL/WINDOWS PC (not shown) and/or a remote data center or multiple data centers over the INTERNET (not shown) for purposes of postage related transaction processing, data acquisition and/or data processing relating to the carrier selection, rating, performance selection and business rules preferences described herein.

In an alternative applicable to any relevant embodiment herein, the mailing machine 100 may be used in conjunction with another mailing machine (not shown) upstream that can be used to sort the mail by size, shape, weight, etc. The upstream mailing machine may be used to perform automated carrier selection and to print an indicator such as a barcode on each mail piece during upstream processing to indicate the desired carrier and/or rating information. The mailing machine 100 then reads the barcode and applies the appropriate postal indicium or indicia to each mail piece.

Figure 2:
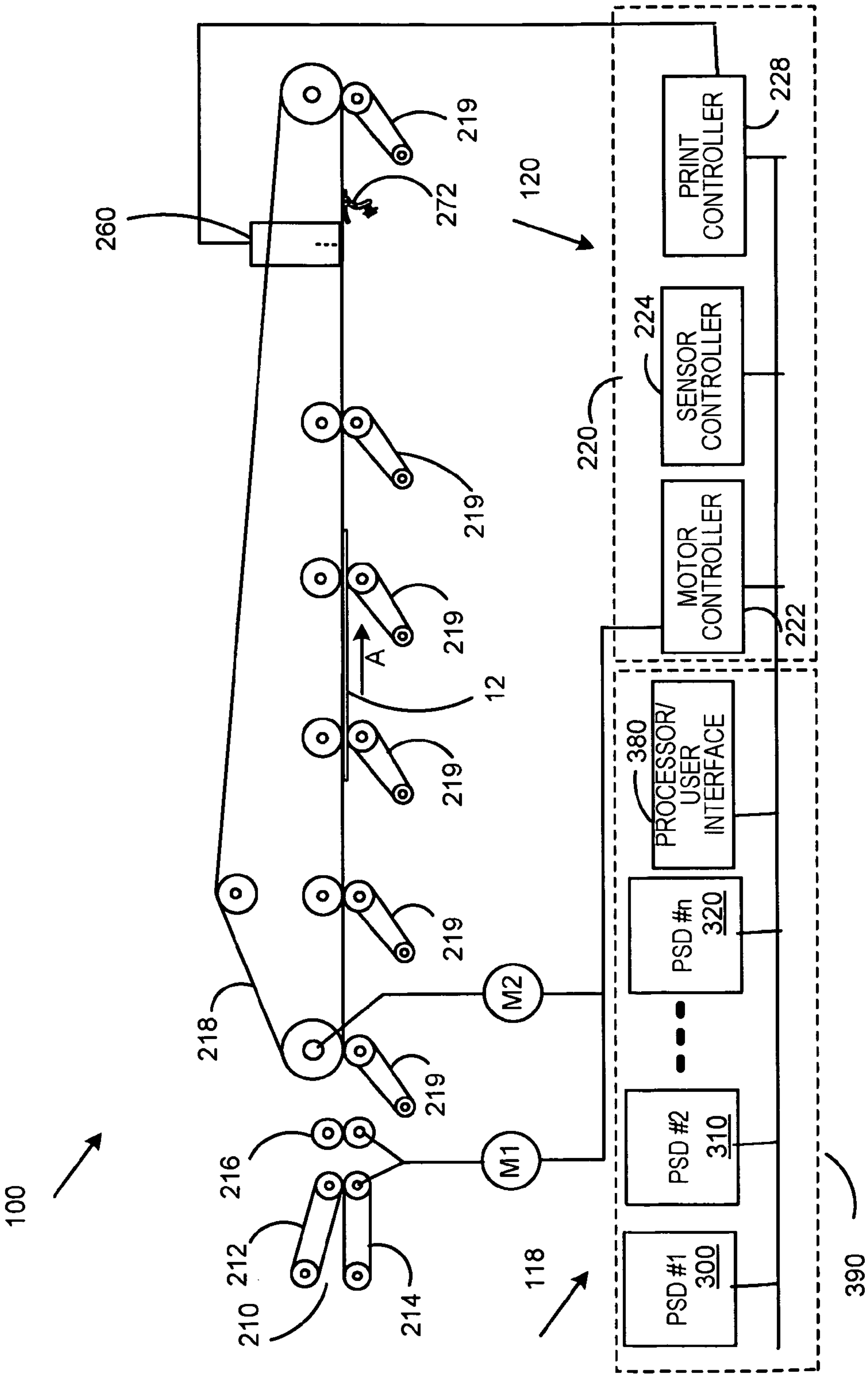
FIG. 2 is a partial schematic diagram of the mailing machine of FIG. 1 including a user interface controller with a plurality of postal security devices and a printer subsystem including controller and media transport.

Referring to FIG. 2, a partial schematic diagram of the mailing machine 100 of FIG. 1, including a user interface controller 118 with a plurality of postal security devices 300, 310, 320 and a printer subsystem including controller and media transport is shown. The controller and transport subsystem configuration is illustrative and other suitable subsystem configurations may be substituted as appropriate. The conveyor subsystem includes a singulator module 210 that receives a stack of media such as a stack of envelopes (not shown) including envelope 12, or other mail pieces such as postcards, folders and the like, and separates and feeds them serially in a path of travel as indicated by arrow A. The conveyor subsystem feeds the envelopes 12 in the path of travel A along a deck past the printer subsystem so that a postal indicia or other marking can be printed on each envelope 12. Together, the singulator module 210 and the conveyor module make up a transport subsystem for feeding the media in mailing machine 100. The singulator module 210 includes a feeder assembly 214 and a retard assembly 212 which work cooperatively to separate a stack of envelopes (not shown) and feed them one at a time to a pair of take-away rollers 216. The feeder assembly 214 and take-away rollers are driven by motor M1 using any suitable drive train (not shown).

The conveyor subsystem includes an endless belt subsystem 218 including a belt and pulleys (including a drive pulley driven by motor M2) mounted to any suitable structure (not shown) such as a frame. The drive pulley is operatively connected to motor M2 by any conventional means such as intermeshing gears (not shown) or a timing belt (not shown) and controlled by motor controller 222 in order to advance the envelope 210 along the path of travel A. The conveyor subsystem also includes a plurality of idler pulleys with normal rollers 219. The normal force rollers 219 work to bias the envelope 210 up against the deck including a top registration plate in a system known as top surface registration. In the area of the print subsystem, the registration plate has appropriate opening and media "ski" 272 near the print head 260 used to top register the mail piece. The print head 260 is used to print cryptographically secure postal indicia that provide evidence of postage payment dispensed by one or more of postal security devices 300, 310, 320.

The main controller subsystem 220 includes motor controller 222, sensor controller 224, and the print controller 228 along with associated memory and peripheral components (not shown) mounted on circuit boards in the mailing machine 100 chassis. The sensor controller 224 preferably controls media location detectors such as optical position detectors and other mailing machine sensors (not shown). The user interface controller 118 may be removable from the mailing machine 100 and includes a circuit assembly 390 with a main processor/user interface controller 380 and a plurality of physically secure postal security device modules 300, 310, 320. Other modules of the mailing machine 100 have not been shown for the sake of clarity. Processor/user interface 380 includes a communications subsystem (not shown) for connection to a remote data center such as by modem dial-up connection or through an ETHERNET network to connect remotely through a network such as the INTERNET.

Figure 3:
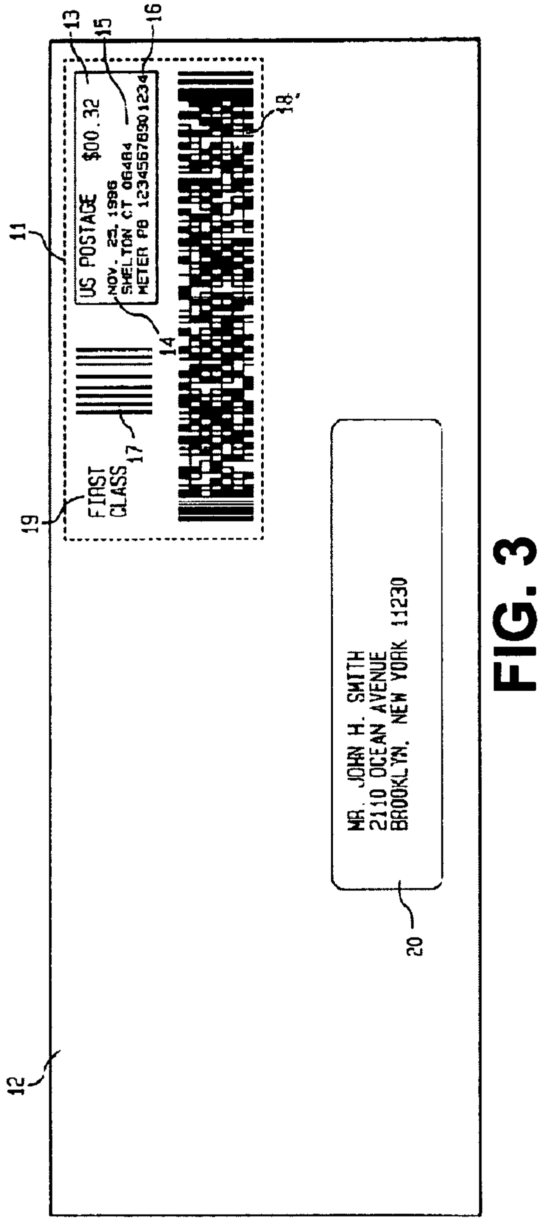
FIG. 3 is a schematic diagram of a mail piece printed with a postal indicium associated with a selected postal security device according to an illustrative embodiment of the present application.

Referring to FIG. 3, a schematic diagram of a mail piece 12 printed with a postal indicium 11 associated with a selected postal security device according to an illustrative embodiment of the present application is shown. Mail piece 12 includes a USPS Compliant Information-Based Indicia (IBI) 11. Such indicium 11 is printed by mailing machine 100 according to the format specified when the carrier selected is the USPS. The postal indicia 11 contains a postage value, such as dollar amount 13, the date 14 that the postal indicia was affixed to the mail piece, the origin the mail piece was mailed from 15, the postal meter serial number 16, a FIM code 17 and a 2D IBI bar code 18. Some of the human readable information described above is also included in the digitally signed barcode 18 in machine readable form. Some of the information provided in the indicium 11, such as PSD ascending and descending register values, is included only in the barcode. The IBI Indicia 11 also contains a service class indication 19 for the mail piece. For example, this particular mail piece is being sent by USPS FIRST CLASS MAIL service. The mail piece 10 also includes a destination address field 20. Optionally, the mail piece 12 would include return address information. The mailing machine would apply a carrier selection process and then apply the appropriate indicia format.

Figure 4:
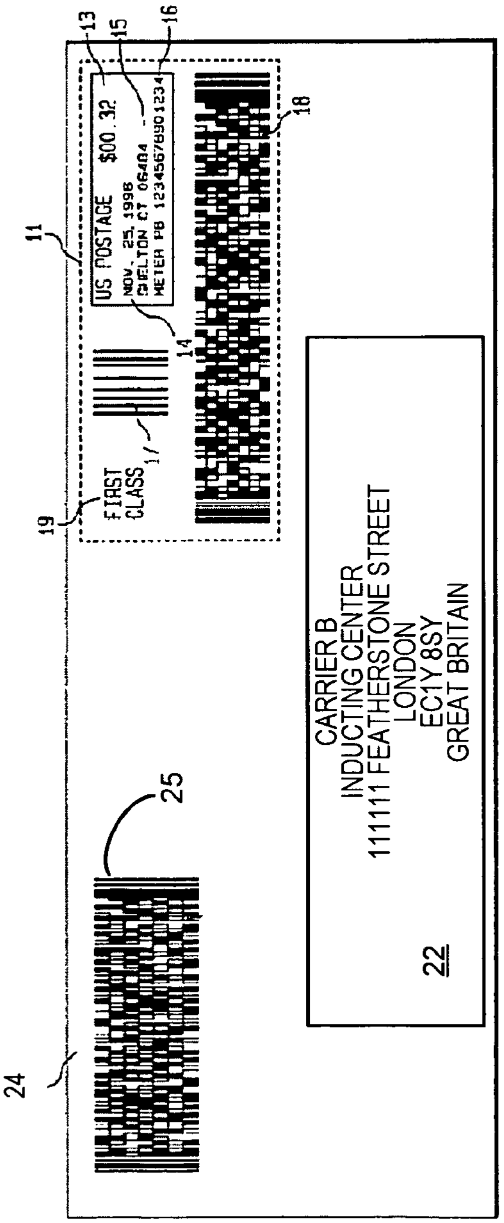
FIG. 4 is a schematic diagram of a mail piece printed with two postal indicia, each associated with a separate selected postal security device according to another illustrative embodiment of the present application.

Referring to FIG. 4, a schematic diagram of a mail piece 24 printed with two postal indicia 11, 25, each associated with a separate selected postal security device according to another illustrative embodiment of the present application is shown. This embodiment illustrates multiple carrier processing with a first carrier delivering to a second carrier that then delivers the mail piece to the final destination. The first carrier is not necessarily made aware of the final destination. If the mail piece 24 were to include optional return address information, barcode 25 would be located below that field. Each carrier provides format definitions regarding its primary indicia format and any intermediate indicia format if intermediate processing is available.

The carrier selection used here is illustrative of a preset business rule. Here, the user does not wish to use the UK ROYAL MAIL for delivery in the United Kingdom. The user determines for example, that the USPS always uses the UK ROYAL MAIL for mail pieces that it delivers to the UK. The user would like to use UPS for delivery in the UK, but the rates are cheaper if the route is broken into two legs, with the USPS making the first delivery o the UPS facility in the UK and then UPS delivering to the final destination. Accordingly, for any UK bound letters, the mailing machine 100 applies a USPS indicium 11 for USPS delivery to carrier B and for further processing according to a preset arrangement with carrier B (UPS in this example) using postage payment indicia format 25.

Here, Carrier B has an intermediate processing indicia definition in addition to its normal indicia definition. Here, when used as an intermediary, carrier B defines postal indicia format 25 (illustrated as a 2D barcode) to include postage payment evidencing and also required destination information such as a unique mail piece Identifier to be used with an out-of-band electronic process to procure destination data or the actual destination data that may be encrypted or otherwise cryptographically secured. For example, the first carrier may not be able to read and/or decode the information in barcode 25.

The initial address field 22 is printed to provide a delivery address to the first carrier. In this case, the first delivery address is to the inducting (intake) facility of the second carrier. The second carrier will obtain payment and delivery information from postal indicium 25 that includes a final destination address and appropriate evidence of payment from the second carrier inducting center to the final destination. The second carrier can then process the mail piece as required to deliver the mail piece to the final destination. For example, if the second carrier uses optical destination scanning equipment, an "over label" may be printed and applied over field 22 to cover up the Carrier B address and instead shown the final destination information. For example, the "yellow" change of address semi-permanent address labels used in postal address change notification applications may be modified for such a purpose. Additionally, permanent labels or other printing/marking systems may be used as appropriate to modify the mail piece for the carrier B delivery systems and the reverse side of the envelope may be used. Moreover, an "over envelope" may be applied and the mail piece inserted into another envelope for final delivery.

Figure 5:
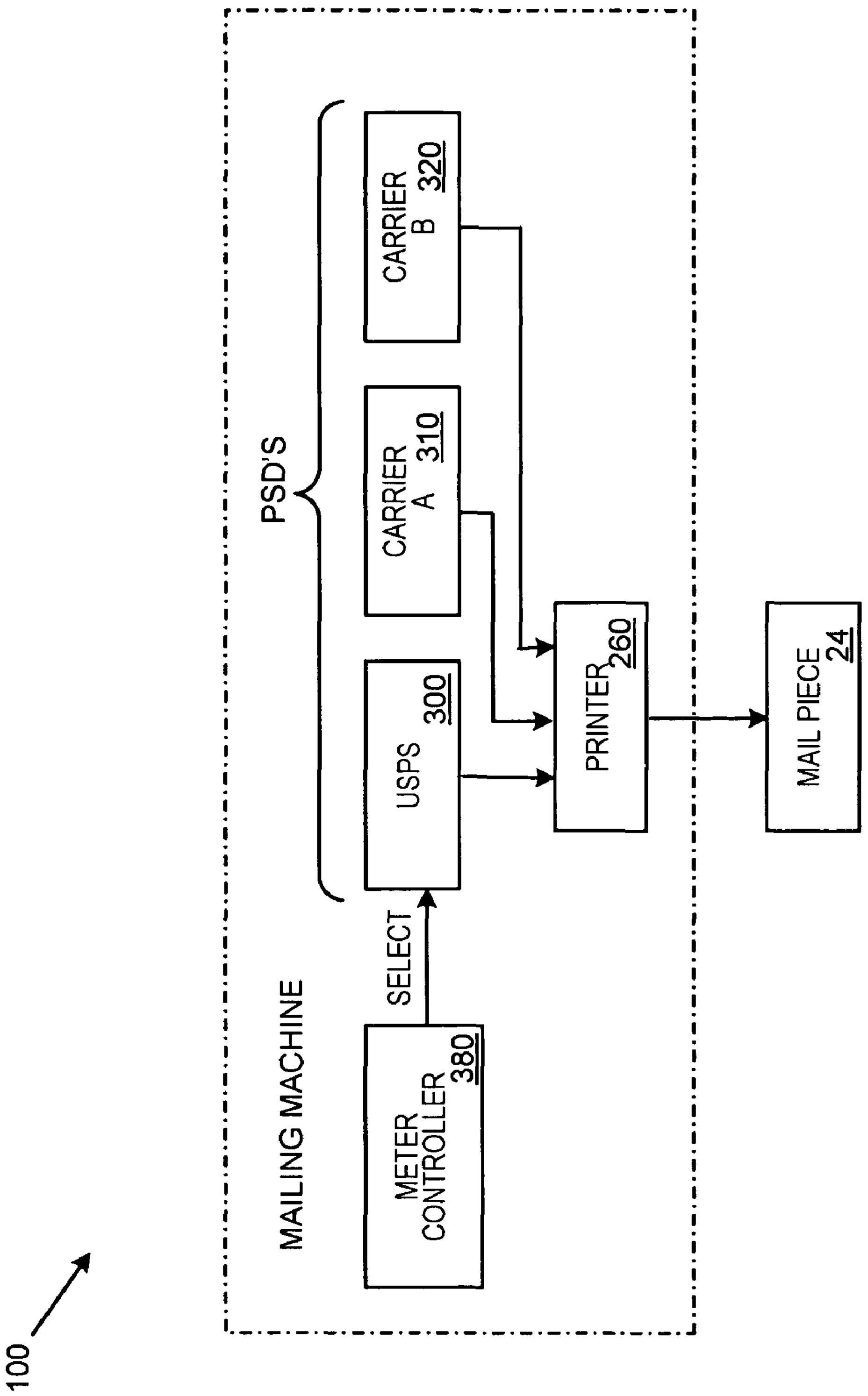
FIG. 5 is a partial schematic diagram of the mailing machine of FIG. 1 including a user interface controller with a plurality of postal security devices.

Referring to FIG. 5, a partial schematic diagram of the mailing machine 100 of FIG. 1 including a user interface controller processor 380 with a plurality of postal security devices 300, 310, 320 is shown. Any one or more of the selection processes described or referred to herein are then used to select a carrier or carriers for the mail piece. Printer 260 is used to print the appropriate indicia format for the selected carrier. In an alternative applicable to any of the embodiments herein, multiple print heads and ink supplies may be utilized in order to cover a wide range of physical indicia requirements associated with the PSDs 300, 310, 320 and the related carriers. For example, printer subsystem 260 comprises an inkjet print head for printing USPS compliant red fluorescent ink. A plurality of additional printer subsystems (not shown) may be included to provide compatibility with a wide range of postal indicia requirements. The multiple print heads then each have a print station with top registration plate opening. However, the print heads may also be configured to print over a single print station in a mutually exclusive arrangement. In the case of two print heads, they may be configured with two horizontally opposed home stations arranged in a line perpendicular to the paper path of mail piece 24.

The mailing machine 100 user may simply select a carrier using the user interface controller 118. Alternatively, the mailing machine 100 may suggest a carrier selection for the user such as based upon price, service availability and carrier congestion/delay data obtained from the carrier or other third party that has such data. In yet another alternative, the mailing machine 100 may be programmed to automatically select a carrier based upon any of the criteria above or other preset business rules such as the UK carrier preference rule described above with reference to FIG. 4. The system may use a most likely to be reliable delivery date guarantee determination based upon guarantee history data. The system may select a carrier based upon availability of a desired or compatible service. The system may select a carrier based upon availability of a discount from a particular carrier within an acceptable time frame for the desired delivery date. Additionally, the system may select a carrier based upon a mail piece discount aggregation opportunity available for one or more of the carriers. Additionally, any available known carrier selection system and method may be adapted to the embodiments described herein to allow a wide range of carrier selection possibilities.

Moreover, the carrier selection methodology may comprise a system and method for routing selection using statistical data such as described in the illustrative embodiments of commonly-owned, co-pending U.S. patent application Ser. No. 11/844,437, filed Aug. 24, 2007 by Matthew J. Campagna, et al. under, such patent application incorporated herein by reference in its entirety. The selection engine described therein may be adapted for use herein including all of the types of parameter information described and referred to there along with the route scoring and selection methods. The one or more information brokers used therein may be resident in a separate server or located in one or more of the remote data centers connected to mailing machine 100 associated with one or more of the relevant carriers. The mailing machine 100 may make a single carrier selection and produce a mail piece such as mail piece 12 shown in FIG. 3 or may make a multiple carrier selection and produce a dual indicium mail piece such as that shown in mail piece 24 of FIG. 4.

The user may select a carrier for a batch of mail. However, the mailing machine 100 may automatically process carrier selection by reading addressee information from the mail piece using an optical scanner (not shown). Moreover, an upstream mailing machine may be used to perform the carrier selection and then mark the mail piece 12 with an identifier such as a barcode to provide carrier selection data to mailing machine 100 by way of a barcode reader (not shown). Additionally, a co-located processor may have mail piece information that is used to provide carrier selection data and intermediate carrier indicia data and formatting instructions. The mailing machine may use a locally unique mail piece identifier to coordinate with the co-located processor.

Figure 6:
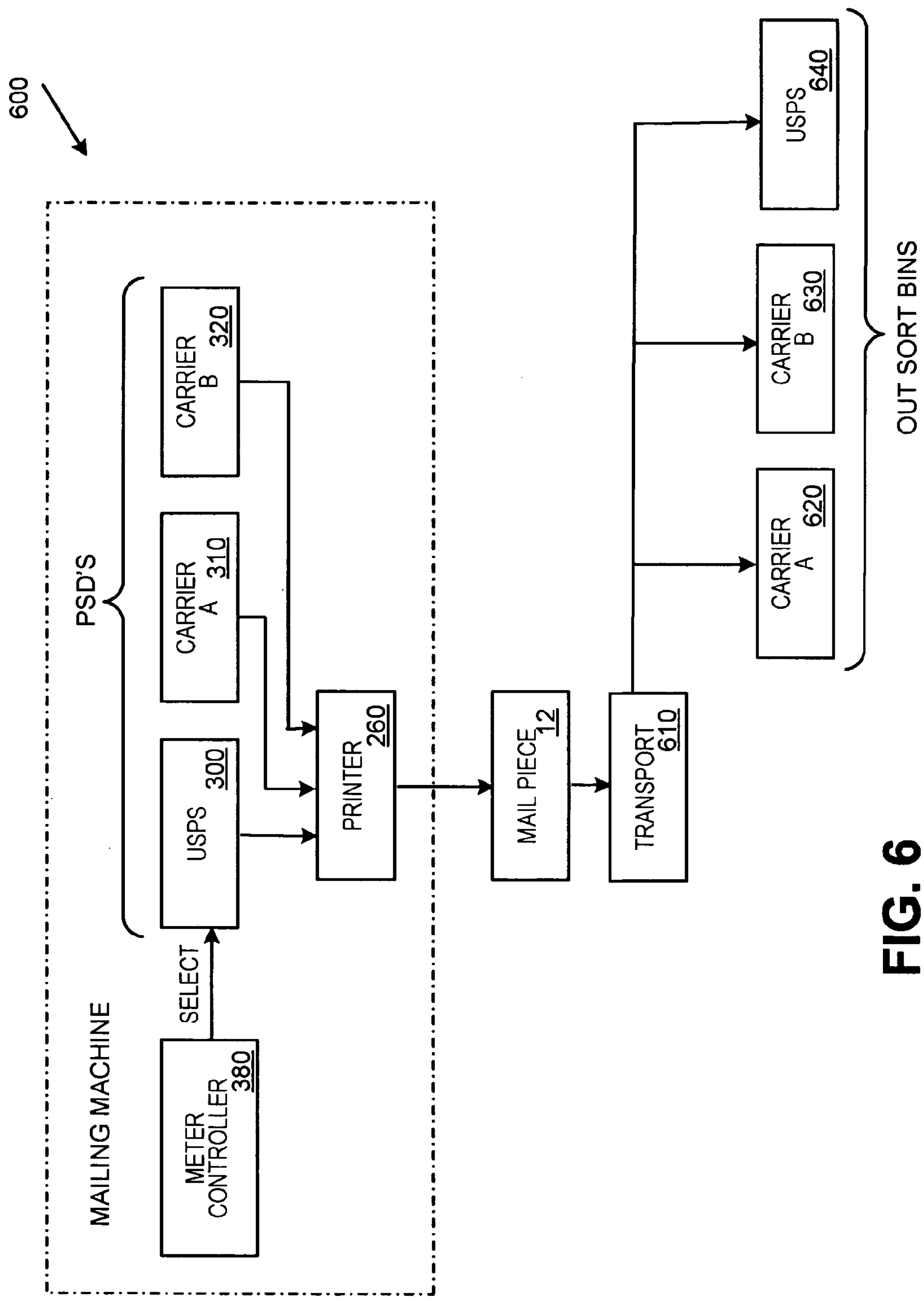
FIG. 6 is a partial schematic diagram of a mailing machine including a plurality of postal security devices and out-sort subsystem according to another illustrative embodiment of the present application.

Referring to FIG. 6, a partial schematic diagram of a mailing machine 600 including a plurality of postal security devices 300, 310, 320 and out-sort subsystem 610, 620, 630, 640 according to another illustrative embodiment of the present application is shown. Any one or more of the selection processes described or referred to herein are then used to select a carrier or carriers for the mail piece. Printer 260 is used to print the appropriate indicia format for the selected carrier. In an alternative applicable to any of the embodiments herein, multiple print heads and ink supplies may be utilized in order to cover a wide range of physical indicia requirements associated with the PSDs 300, 310, 320 and the related carriers. The mail piece is printed and then output such as at the equivalent to area 116 of mailing machine 100 shown in FIG. 1. A transport 610 is located at the mailing machine output that automatically conveys the mail piece 12 to the appropriate out sort bin 620, 630, 640 associated with the respective carrier and PSD. In this embodiment, the PSDs are hot swappable and may be removed and replaced in the mailing machine 600 without a soft or hard reboot of the mailing machine.

Figure 7:
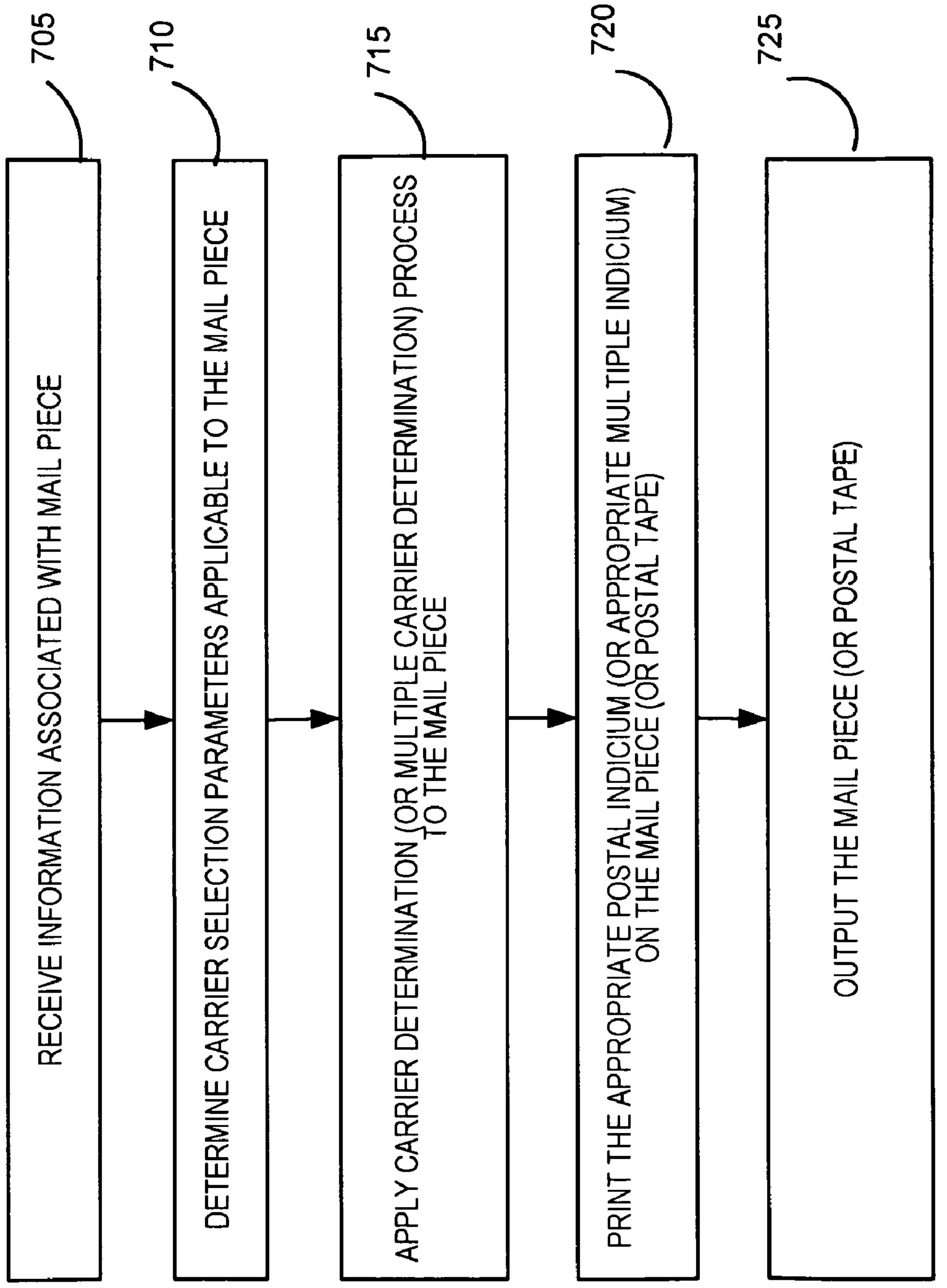
FIG. 7 is a flow chart describing a process for selecting a carrier for a mail piece and applying an appropriate postal indicium according to an illustrative embodiment of the present application.

Referring to FIG. 7, a flow chart describing a process for selecting a carrier for a mail piece and applying an appropriate postal indicium according to an illustrative embodiment of the present application is shown. In step 705, the process starts and receives information about the mail piece. The process may receive that information from a user entering data into keypad 120, a co-located process, from a marking applied by an upstream mailing machine or from reading a code or text on the mail piece using a barcode reader or OCR scanner. In two separate examples, the mailing machine may obtain data that indicates the first mail piece address is in Connecticut (overnight service desired) and the second mail piece address is in the UK (any speed, lowest cost with overriding preferred carrier desired).

In step 715, the process applies the carrier determination logic (or multiple carrier determination logic as the case may be). In the first example, the information associated with the mail piece indicates that it is an overnight letter. The business rules may indicate that the USPS EXPRESS MAIL service be utilized. Alternatively they might indicate that UPS overnight service be utilized. In either case, the appropriate carrier is determined. In the second example, the address indicates a destination in the UK. As described above, that information may trigger a dual carrier process as described above. In another example, the mailing machine may obtain data that indicates the address is in the UK. As described above, that information may trigger a dual carrier process as described above.

In step 720, the process prints the appropriate indicium (or appropriate multiple indicium as the case may be) on the mail piece. Of course, the mail piece may be a parcel and then the indicium would be printed on a postal tape to be applied to the parcel. If the multiple indicium formats require two print heads, the mailing machine 100 uses separate print heads to print the separate indicium. In step 725, the process outputs the mail piece and ends.

The processes described herein are programmed in the appropriate assembler language for the CPU processor used such as the RENASAS SH series processors or the INTEL ATOM processors. Alternatively, the C or C++ programming language or other appropriate higher level language may be utilized to create the programs resident in the program memories of mailing machine 100 and postal security devices 300, 310, 320. The computing subsystem 390 comprises a single board computer such as a RENESAS SH series single board computer or an INTEL ATOM x86 single board computer with a plurality of USB interfaces to the plurality of PSDs 300, 310, 320 using a standard connector. A single serial bus (USB) may be utilized if appropriate bandwidth is available, or multiple distinct USB busses may be used. However, a plurality of slots using various standard PSD connectors may be used as appropriate to accommodate a wide range of carriers. In another alternative, each PSD slot includes a converter slot to receive a customizable module that converts each PSD interface to operate using the USB bus connected to the single board computer.

The processors run on real-time or other operating systems such as QNX, embedded LINUX or WINDOWS CE stored in memory. In another alternative embodiment applicable to any of the relevant embodiments herein, the mailing machine 100 comprises an inserter capable mailing machine such as a modified DM INFINITY postage meter and may also comprise a plurality of modified DM INFINITY system networked in interact and provide a larger number of PSD possibilities if each populated with a different set of PSDs. Mail pieces as used herein may include a wide range of material such as postcards, letters, envelopes, flats and postal tape for application to a parcel.

Commonly-owned, co-pending patent application Ser. No. 12/345,587, entitled "MULTIPLE CARRIER MAIL SORTING SYSTEM" and filed contemporaneously herewith by Edilberto I. Salazar, et al. is incorporated herein by reference in its entirety. Any of the embodiments therein or portions thereof, specifically carrier selection methods, may be combined with the embodiments herein as would be known by one of skill in the art practicing the teachings herein.

A number of embodiments of the present invention and relevant alternatives have been described. Nevertheless, it will be understood that various modifications may be made without departing from the spirit and scope of the invention. Other variations relating to implementation of the functions described herein can also be implemented. Accordingly, other embodiments are within the scope of the following claims.

We claim:

1. A mailing machine for printing postal indicia as evidence of postage payment on a mail piece comprising:

a printer subsystem having at least one print head for printing the postal indicia on the mail piece;

a first processor operatively connected to the printer subsystem; and a plurality of postal security devices comprising at least two postal security devices disposed in the mailing machine and operatively connected to the first processor, wherein the first processor is configured to select a first one of the plurality of postal security devices to print a first postal indicium on the mail piece using one of the at least one print head, wherein the first processor is configured to facilitate funds transfers between the at least two postal security devices;

the first processor is configured to select a second one of the plurality of postal security devices to print a second postal indicium on the mail piece; and the second postal indicium is printed using a second one of the at least one print head.

2. The mailing machine according to claim 1, wherein, the first processor is configured to select a first one of the plurality of postal security devices using input received from an operator of the mailing machine.

3. The mailing machine according to claim 1, wherein, the first processor is configured to select a first one of the plurality of postal security devices using input obtained from reading a destination address printed on the mail piece.

4. The mailing machine according to claim 1, wherein, the first processor is configured to select a first one of the plurality of postal security devices using input obtained from reading a carrier selection identifier printed on the mail piece.

5. The mailing machine according to claim 1, wherein, the first processor is configured to select a first one of the plurality of postal security devices using input obtained from a co-located processor.

6. The mailing machine according to claim 1, wherein, the first processor is configured to select a first one of the plurality of postal security devices using input obtained from a remote data center.

7. The mailing machine according to claim 1, wherein, at least two of the plurality of postal security devices are associated with a first carrier.

8. The mailing machine according to claim 7, wherein, each the at least two of the plurality of postal security devices associated with the first carrier store funds denominated in a different currency.

9. The mailing machine according to claim 1, further comprising:

an output sorter including a separate output bin associated with each of the plurality of postal security devices.

10. The mailing machine according to claim 1, wherein, the first processor is configured to select a first one of the plurality of postal security devices using input received from a routing selection process using statistical data.

11. The mailing machine according to claim 1, wherein, the first processor is configured to select a first one of the plurality of postal security devices using a lowest cost calculation.

12. The mailing machine according to claim 1, wherein, the first processor is configured to select a first one of the plurality of postal security devices using a most likely reliable delivery date guarantee determination.

13. The mailing machine according to claim 1, wherein, the first processor is configured to select a first one of the plurality of postal security devices using a preferred carrier determination for a destination address associated with the mail piece.

14. The mailing machine according to claim 1, wherein, the first processor is operatively connected to the plurality of postal security devices using a single serial bus.

15. The mailing machine according to claim 1, wherein, the first processor is operatively connected to the plurality of postal security devices using a plurality of communications busses.

16. A mailing machine for printing postal indicia as evidence of postage payment on a mail piece comprising:

a printer subsystem having at least one print head for printing the postal indicia on the mail piece;

a first processor operatively connected to the printer subsystem;

a plurality of postal security devices operatively connected to the first processor, wherein the first processor is configured to select a first one of the plurality of postal security devices to print a first postal indicium on the mail piece using one of the at least one print head; and a networked connection to a second mailing machine, wherein the mailing machine is configured to pass a mail piece downstream without printing an indicium if the second mailing machine has a more appropriate PSD.

17. A mailing machine for printing postal indicia as evidence of postage payment on a mail piece comprising:

a printer subsystem having at least one print head for printing the postal indicia on the mail piece;

a first processor operatively connected to the printer subsystem;

a plurality of postal security devices operatively connected to the first processor, wherein the first processor is configured to select a first one of the plurality of postal security devices to print a first postal indicium on the mail piece using one of the at least one print head; and the first processor is configured to select a second one of the plurality of postal security devices to print a second postal indicium on the mail piece.

* * * * *